United States Patent [19]

Strecker

[11] Patent Number: 5,030,816
[45] Date of Patent: Jul. 9, 1991

[54] WELDABLE SEALANT CONTAINING ELECTRICALLY CONDUCTIVE FIBERS

[75] Inventor: Lawrence A. Strecker, St. Louis, Mo.

[73] Assignee: United Technologies Automotive Inc., Dearborn, Mich.

[21] Appl. No.: 390,023

[22] Filed: Aug. 7, 1989

[51] Int. Cl.⁵ .............................................. B23K 11/16
[52] U.S. Cl. .................................... 219/91.2; 219/118
[58] Field of Search ..................... 219/91.21, 91.2, 92, 219/117.1, 85.11, 118

[56] References Cited

U.S. PATENT DOCUMENTS

| | | | |
|---|---|---|---|
| 2,510,727 | 6/1950 | Sussenbach | 260/33.2 |
| 3,230,290 | 1/1966 | Nelson et al. | 264/320 |
| 3,437,783 | 4/1969 | Lemelson | 219/117 |
| 4,195,215 | 3/1980 | Clarke | 219/91.21 |
| 4,507,421 | 3/1985 | Symietz | 219/91.2 |
| 4,559,373 | 12/1985 | Guthrie et al. | 523/220 |
| 4,661,675 | 4/1987 | Guthrie et al. | 219/91.21 |
| 4,749,434 | 6/1988 | Harrison | 156/306.9 |
| 4,749,833 | 6/1988 | Novorsky et al. | 219/85.11 |
| 4,924,057 | 5/1990 | Puddle et al. | 219/118 |

OTHER PUBLICATIONS

Handbook of Epoxy Resin, Copyright 1967, McGraw-Hill Book Company, pp. 14-33.

Primary Examiner—Clifford C. Shaw

[57] ABSTRACT

The present invention discloses a weld-through adhesive sealant comprising a heat deformable reactive resin matrix containing randomly oriented, electrically conductive fibers throughout the matrix. In additon, a method of joining two metal members using said adhesive sealand is also disclosed.

7 Claims, No Drawings

WELDABLE SEALANT CONTAINING ELECTRICALLY CONDUCTIVE FIBERS

DESCRIPTION

1. Technical Field

This invention pertains to the art of adhesive and sealants and particularly to electrically conductive adhesives and sealants.

2. Background Art

The tapes are widely used in the automotive industry. The tapes are applied to seal gaps between adjoining ferrometallic components of automobile bodies.

A weld-through sealant, i.e., a sealant tape which may be placed between two ferrometallic members and allow joining of the two members by spot welding through the tape, while acting as an adhesive to assist the bond between the members would offer a number of desirable options to manufacturers, particularly the automotive industry.

DISCLOSURE OF THE INVENTION

A weldable adhesive sealant is disclosed. The tape comprises from about 20 weight percent to about 80 weight percent of a deformable reactant resin matrix and from about 20 weight percent to about 80 weight percent randomly oriented electrically conducted fibers distributed throughout the matrix.

A method for joining two metal members is also disclosed. A strip of the above described weld-through sealant is disposed between the members and the members are spot welded together through the strip of weldable sealant tape.

BEST MODE FOR CARRYING OUT THE INVENTION

The adhesive sealant of the present invention comprises a deformable reactive resin matrix and randomly oriented electrically conductive fibers distributed throughout the matrix.

The composition of the deformable reactive resin matrix is not critical, provided that important functional limitations regarding reactivity, bonding and viscosity are met.

With regard to reactivity, the resin matrix of the present invention may be any deformable reactive resin matrix which exhibits a room temperature shelf life of greater than about 90 days, but which is sufficiently reactive to cure at elevated temperatures. Where the adhesive sealant is to be used for automobile construction, the cure temperatures should be within the time and temperature profile of an automotive paint bake cycle (e.g. 30 minutes at 163° C.).

It is preferred that the resin matrix of the present invention comprise materials having epoxide functionality of two or more and an epoxy curing agent. Suitable functional epoxy materials include epoxy resins, epoxy elastomer adducts and mixtures of epoxy resins and epoxy elastomer adducts, and mixtures of epoxy resins, epoxy elastomers and other resins and elastomers which lack two or more epoxide functional groups. Suitable epoxy resins include bisphenol A based epoxy resins such as the diglycidal ether of bisphenol A. Suitable epoxy elastomers include carboxyl modified nitrile, polysulfide or polyether epoxy adducts. In addition, blends of epoxy and elastomers may be formulated as well.

The curing agent for the toughened epoxy is chosen such that the sealant formulation of the present invention exhibits a room temperature shelf life of greater than about 90 days, but is sufficiently reactive to cure the epoxy resin within a desired time and temperature profile The cure cycle may be adjusted by selection of the appropriate curing agent or accelerator Lewis acid accelerators blocked amine complexes are preferred curing agents. Blocked amine complexes such as boron trifluoride amine complexes (e.g. boron trifluoride monoethylamine) and boron trichloride amine complexes (e.g. Ciba Geigy DY9577) were found to be suitable curing agents for use in the practice of the present invention. Ciba Geigy DY9577 is a particularly preferred curing agent. The sealant formulation preferably includes from about 1.5 weight percent to about 2.5 weight percent of the curing agent.

The viscosity of the deformable reactive resin matrix of the present invention is temperature dependant. With regard to viscosity, the resin matrix may be any deformable reactive resin matrix which is a self-supporting viscoeleastic solid at room temperature and which becomes sufficiently fluid under welding conditions so that the matrix may be displaced or partially displaced from the weld area during welding. The room temperature properties of the tape may be conveniently characterized using the cone penetrometer test described in ASTM D-5. It is preferred that the tape of the present invention allow penetration of about 50mm to about 150mm by a 150 gram (g) cone at about a temperature of 25° C. using the above-referenced test method. The resin matrix is partially displaced from the weld area during welding due to the combined affect of the force applied by the welding electrodes and the resistance heating in the weld area.

Other resins and elastomers which lack epoxide functionality may be included in the reactive resin matrix to adjust the physical properties of the matrix, i.e., elastomeric resins to improve shock resistance, lipophilic resin to improve bonding to oily surfaces Suitable hydrocarbon resins should have a melting temperature between about 66° C. and below the weld temperature of the welding process (538° C.) and which are compatible with the other components included in the particular adhesive sealant composition. Compatibility may be defined in terms of solubility and reactivity. A compatible resin is one that forms a one phase mixture with the other components of the tape formulation and one which undergoes no undesired reactions with the other components of the tape formulation. Suitable elastomeric ingredients include acrylic elastomers and nitrile elastomers. Nitrile elastomers are preferred A nitrile butadiene rubber known as XF372, available from Polysar, has been found to be particularly well suited to the practice of the present invention.

For example, a weldable sealant tape composition for bonding oil contaminated metal members may include lipophilic resins or elastomers. A lipophilic terpene phenolic resin known as super Bechacite 24-020, available from Reichold Corp. has been found to be useful in this regard. A lipophilic block styrene butidiene rubber found to be suitable for use with oily substrates is known as Kraton 1101 and is available from Shell Chemical Corp. Lipophilic resins and elastomers may comprise up to about 30 weight percent of the sealant tape of the present invention. It is preferred that the elastomeric ingredient comprise between about 3 weight percent and about 15 weight percent of the sealant tape of the present invention.

The matrix of the present invention may also include conventional fillers, diluents and processing aids familiar to those skilled in the art. For example, a preferred embodiment of the adhesive sealant of the present invention includes a chemical foaming agent which decomposes upon heating to form gaseous products thereby allowing the tape to swell and fill gaps between the joined metal members during curing. Nitrogen producing foaming agents such as benzene sulfanyl hydrazine and azobisformamide, have been found suitable for use in the present invention. The adhesive sealant may include conventional fillers such as talc, silica, and carbon black.

The metallic fibers of the present invention include any electrically conductive, i.e., metallic fibers. Examples of suitable metallic fibers include copper fibers, silver fibers and steel fibers. Steel fibers are preferred since the primary application for the sealing tape of the present invention is in bonding and sealing adjoining ferrometallic components of automobile bodies. Chopped steel wool (#0 fibers and #3 fibers chopped to ¼ inch lengths), available from International Steel Wool, have been found to be suitable for practice of the present invention. (By fiber it is intended that they not be particles. Typically, this will mean that the fibers will have an aspect ratio of greater than 10:1). The sealant tape of the present invention includes from about 30 weight percent to about 60 weight percent of the metallic fibers.

The raw materials of the weldable sealant tape of the present invention are thoroughly mixed in a convention medium shear mixer (e.g. a sigma blade mixer). Mixing temperature must be controlled to avoid premature curing of the tape formulation. The raw materials comprising the sealant formulation, other than the epoxy curing agent and chemical foaming agent may be heated up to about 116° C. Epoxy curing agent and foaming agents are temperature sensitive and the range of temperature to which the epoxy curing agent may be exposed during mixing will vary depending on the curing system employed. Typically, the temperature should not exceed 60° C. For example, the mixture must be cooled to a temperature of 60° F. or below prior to the addition of the preferred curing agent, Ciba Geigy DY9577 and chemical foaming agent and must not be allowed to exceed 60° C. after addition of the curing agent, in order to avoid premature curing of the sealant formulation.

After mixing, the homogeneous mixture is extruded using conventional extrusion equipment, to form a thin, flat, elongated strip of adhesive sealant tape. The extrusion temperature may be adjusted to achieve a smooth tape surface, but is not allowed to exceed the activation temperature of the curing agent. (For the preferred Ciba Geigy material, this temperature will be about 60° C. for optimum safe processing.

The tape is then cut into desired lengths and is ready for application to the substrate. The tape is placed between the members to be joined and the assembly is spot welded. The adhesive sealant may be cured by exposure to elevated temperature, e.g., to about 163° C. for about 30 minutes.

EXAMPLE

A weld-through sealant tape comprising:

|  | wt % |
|---|---|
| epoxy resins and elastomers: | |
| cycloaliphatic epoxy (Y184 - Ciba Geigy) | 8.67 |
| elastomer-epoxy adduct (Polydis 36101-5) | 7.5 |
| polyether-epoxy adduct (Polydis 36221-2) | 8.58 |
| epoxy curing agent: | 1.57 |
| boron trichloride amine (DY9577 - Ciba Geigy) | |
| hydrocarbon elastomers: | |
| acrylic nitrile rubber (Polysar XF372) | 3.0 |
| styrene butadiene block copolymer (Kraton 1101 - Shell Corporation) | 7.5 |
| lipophilic resin: | 3.0 |
| terpene phenolic resin (Beckacite 24-020) | |
| foaming agent: (Celogen OT - Uni-Royal) | 0.04 |
| 4,4 oxybis (benzene sulfonyl hydrazine) | 0.15 |
| filler: | |
| Carbon Black (Raven Black) | |
| metal fibers: | |
| steel wool: (#0, Chopped to ¼" lengths) | 59.99 |
| | 100.00 | was formulated Raw materials were added to a Baker-Perkins sigma blade mixer and mixed at low speed for one hour to provide a homogeneous putty-like mass. The mixture was fed to a Bonott extruder, and extruded to form a tape with a 0.35 inch by 0.5 inch cross section. The piece of tape was placed between two sheet of 20 gauge automotive body stock steel. The two sheets were welded together to produce greater than eight 4.5 mm diameter weld nuggets.

A series of adhesive sealant tapes was prepared using a basic resin matrix binder using the formulation disclosed above. Certain minor modifications were made to accommodate different physical properties resulting from the different loading values and materials of the electrically conductive components. These samples were prepared to observe the value of using the electrically conductive fibers in such weld through sealants over using electrically conductive particles.

The resin binder was prepared in the conventional manner and very fine iron powder was introduced at varying concentrations. The electrically conductive fibers introduced were chopped steel wool where the average fiber length was about ¼ of an inch. It is not believed that the length per se is critical and this happens to be a convenient length to work with in this system. The sealant was then extruded to form sealant tape about 0.5 inch wide by about 0.35 inch thick. The sealant was placed between two oily, cold rolled steel body stock and welded at a voltage of about 480-490 volts with a current of 10,000 amperes for 16 half-weld cycles. The resulting samples were then cured for 20 minutes at 163° C.

The results of the quality of the bonds for these samples and the bond strengths as determined by conventional overlap sheer strengths are set forth in table 1 below.

As can be seen the from this table, the welds using the tape with the iron particles failed the weld nugget diameter, while every sample loaded with the fibers had excellent welds. Additionally, the use of the fibers, even at high loadings, does not reduce the bond strength achieved by the sealant.

This formulation, with minor modifications, was tested using different loading of metal fibers and compared to different loadings for iron powder to determine the difference, if any, between the use of metallic fibers over metallic particles. The chart below sets forth the different loadings for the sealant and the resulting weld information.

TABLE I

| Example | Electrically Conductive Component | Loading (Wt. %) | Weldability (# of half-welding cycles on the first weld out of a series of 4) | Weld Nugget |
|---|---|---|---|---|
| 1 | Iron Powder | 55.7 | 0 | — |
| 2 | | 12.6 | 0 | — |
| 3 | | 50.9 | 0 | — |
| 4 | | 13.3 | 0 | — |
| 5 | | 39.1 | 0 | — |
| 6 | | 51.0 | 0 | — |
| 7 | #0 Medium chopped steel-wool | 51.7 | 16 welds | 4.5 mm |
| 8 | | 59.0 | 16 welds | >4.5 mm |
| 9 | | 53.8 | 16 welds | >4.5 mm |
| 10 | | 59.0 | 16 welds | >4.5 mm |
| 11 | | 34.0 | 16 welds | >4.5 mm |
| 12 | | 51.6 | 16 welds | >4.5 mm |
| 13 | | 56.9 | 16 welds | >4.5 mm |

Steel-to-steel panels show 16 half-weld cycles out of 16 possible, virtually the same results as the welds produced using the adhesive sealant of the present invention.

From this testing, it is apparent that the sealant containing electrically conductive fibers provides superior results over a sealant containing electrically conductive particles. The prior art sealants containing metal particles is useless for this intended purpose.

Although this invention has been shown and described with respect to detailed embodiments thereof, it will be understood by those skilled in the art that various changes in form and detail thereof may be made without departing from the spirit and scope of the claimed invention.

I claim:

1. A method for joining two metal members, comprising:
    disposing a strip of weld-through adhesive sealant tape, comprising:
        from about 40 weight percent to about 70 weight percent heat deformable reactive resin, and from about 30 weight percent to about 60 weight percent randomly oriented electrically conductive fibers distributed throughout the matrix, between the members, and
    spot welding the metallic members together through the strip of weld-through adhesive sealant tape.

2. The method of claim 1 wherein the electrically conductive fibers are metallic.

3. The method of claim 2 wherein the reactive resin contains an epoxy-elastomeric adduct.

4. The method of claim 1 wherein the metallic fibers are steel.

5. The method of claim 1 wherein the reactive resin matrix contains an epoxy funcational resin.

6. The method of claim 1 wherein the reactive resin matrix contains a blend of functional epoxy resin and an elastomer.

7. The method of claim 1 wherein the reactive resin matrix contains a functional epoxy-elastomer adduct.

* * * * *